June 27, 1950  W. A. CALDWELL  2,512,766
AUTOMATIC PRESSURE AND TEMPERATURE
EQUILIBRATOR FOR PNEUMATIC TIRES
Filed May 18, 1948  2 Sheets-Sheet 1

Inventor
William A. Caldwell

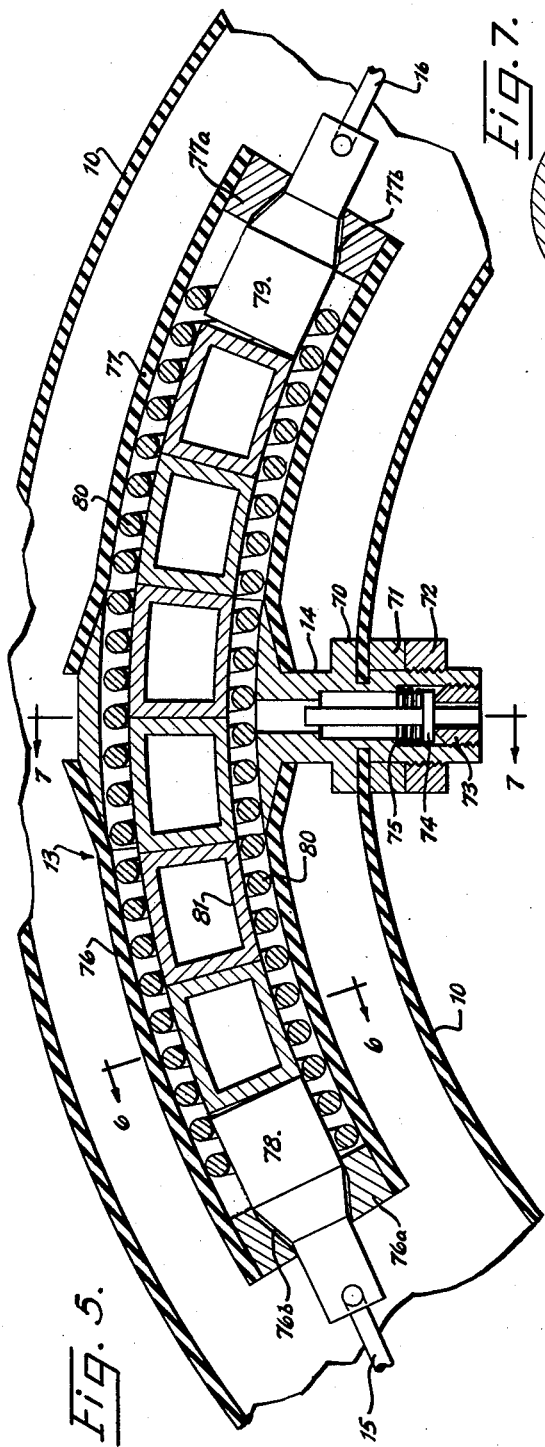
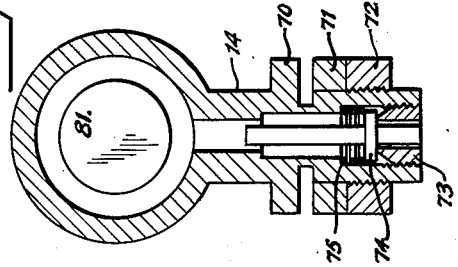
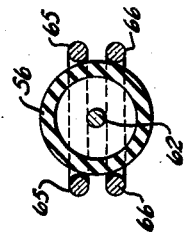
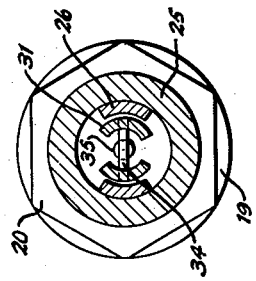
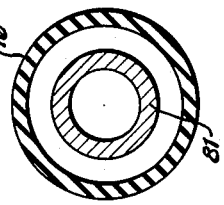

Patented June 27, 1950

2,512,766

UNITED STATES PATENT OFFICE 2,512,766

AUTOMATIC PRESSURE AND TEMPERATURE EQUILIBRATOR FOR PNEUMATIC TIRES

William A. Caldwell, Leesburg, Tex.

Application May 18, 1948, Serial No. 27,776

7 Claims. (Cl. 152—419)

My present invention relates to pneumatic tires for vehicles. It has for its object to provide certain improvements in the construction of such tires, particularly the inner tube, primarily for the purpose of regulating the pressure therein by maintaining continuously a predetermined, initial air pressure under the varying operating conditions of changing weather and changing atmosphere as well as changing temperature within the tire due to friction while operating under adverse road conditions.

A second purpose served by my invention is to regulate the temperature within the tire by a constant, intermittent intaking and outletting of air therefrom.

To accomplish the aforesaid purposes, I provide a pressure and temperature equilibrator disposed within the tire and operated by the centrifugal force generated by the rotation of the wheel carrying the tire in the ordinary course of operation.

As an integral part of the equilibrator conceived as a means to aid and assure its proper functioning, I provide a new type of valve mechanism for the inner tube, located exteriorly thereto and operated by a power member, located within the tube and actuated by changes in the air pressure therein adapted to determine automatically the amount of air that can be and should be injected in the tube initially in order that the pressure may be successfully maintained with the least possible variations; to release excess pressure from the tire as a final step in the circulation of air through it by the equilibrator; and to give timely warning by means of an audible signal of any unusual increase in pressure or loss of pressure beyond the power of the equilibrator to compensate.

To these and other ends, my invention comprises other improvements and advantages as will be fully described in the accompanying specification, the novel features thereof being set forth in the appended claims.

In the drawings:

Figure 3 is a cross section of the valve nipple taken on the line 3—3 of Fig. 2.

Figure 4 is a cross section of the power member taken on the line 4—4 of Fig. 2.

Figure 5 is an enlarged lengthwise section of the pressure and temperature equilibrator.

Figure 6 is a cross section of the equilibrator taken on the line 6—6 of Fig. 5.

Figure 7 is another cross sectional view of the equilibrator taken on the line 7—7 of Fig. 5.

Similar reference numerals in the several figures indicate similar parts.

Figure 1:
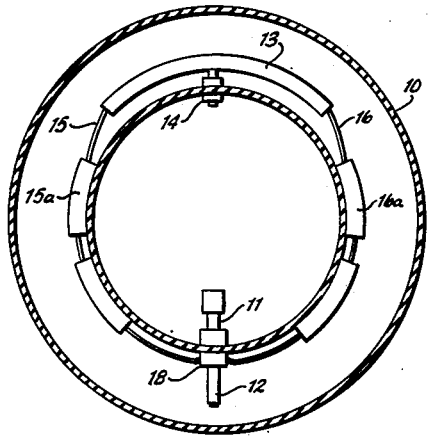
Figure 1 is a vertical cross section of an inner tube of a pneumatic tire, showing the same inflated, in which the several elements of my invention are illustrated as they appear in elevation.

In illustrating my invention, I have shown in Fig. 1 only the air chamber or inner tube 10 of a pneumatic tire, which when inflated as shown, becomes a chamber in the form of a circular tube, which is also circular in cross section. At one point in the tube there is fixed externally the air inlet valve 11, and the associated internally located power member 12. Oppositely disposed within the tube is the pressure and temperature equilibrator indicated as 13 in Fig. 1 and shown in enlarged detail in Fig. 5. Intermediate the ends of this device it is connected to the tube 10 by a nipple 14 having a valve controlled air inlet passage opening exteriorly of the tube. The element 13 has at its ends interior valves which are connected by the flexible rods 15, 16, also located within the tube to the flange 18 of the base of the first mentioned inlet valve. Each of these rods carries multiple weights 15a, 16a, which upon rotation of the wheel carrying the tire are displaced by centrifugal force, and thus serve to actuate the element 13.

Figure 2:
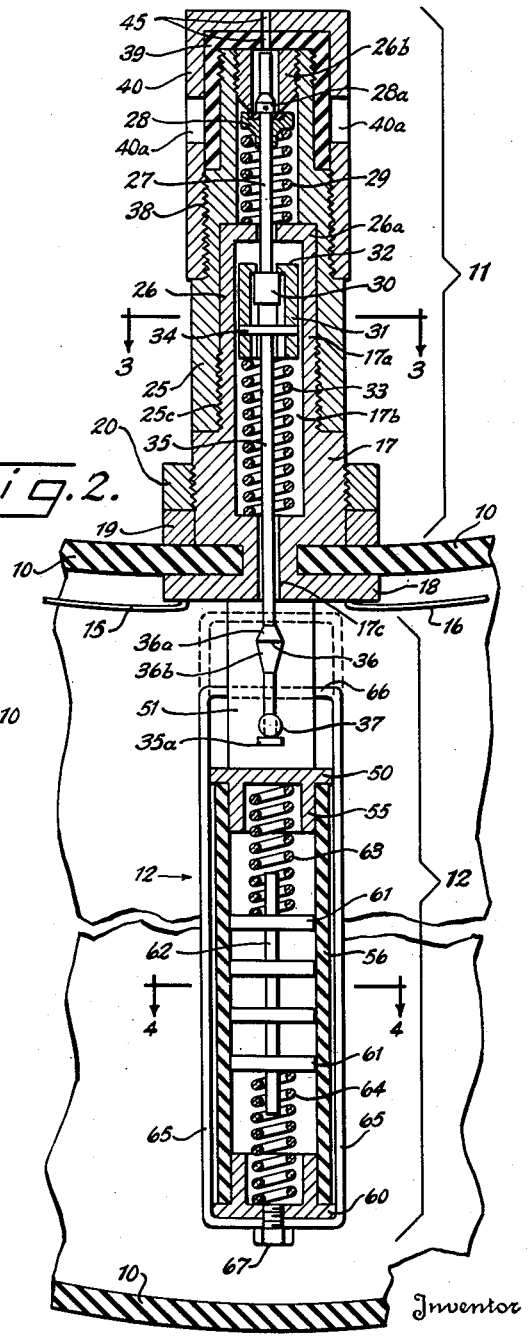
Figure 2 is an enlarged vertical section of the inlet air valve and power member taken on the same sectional plane as that of Fig. 1.
Figure 8:
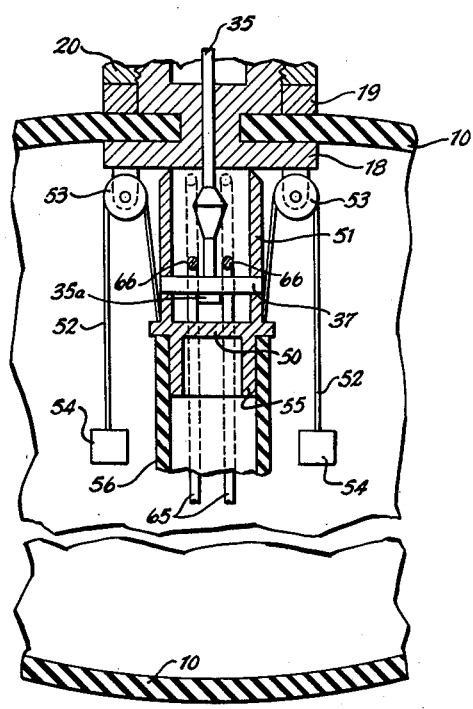
Figure 8 is a fragmentary vertical cross section of the bottom of the inlet valve base taken at right angles to Fig. 2, showing the counterweights attached thereto.

The specially constructed air inlet shown in Fig. 2 comprises a tubular base 17 having at its interior end a flange 18 which engages the inner face of the tube 10, being inserted therein through a suitable aperture cut in the tube. The material of the tube surrounding the aperture is clamped against the flange by collar 19 and compression nut 20. The outer end 17a of the base 17 is reduced in diameter and provided with a central chamber 17b which opens at its inner end into the tube 10 through a passage 17c. The base is extended upwards by a hollow nipple 25 secured by screw threads 25c. Beyond these threads the side walls of the base 17 are cut away to form the arms 26, as shown in the cross sectional view Fig. 3. The upper ends of these arms are turned toward each other to form a shoulder having a perforation in its middle center, as indicated at 26a. The upper end of nipple 25 extends beyond the top of the arms 26 and has a chambered passage, in the extremity of which is inserted a removable tubular screw threaded plug forming an annular valve seat 26b.

There is a valve stem 27 centrally located in the outer end of the nipple 25 carrying a head 28 provided with a rubber pad which is normally closed against the valve seat 26b by a coil spring 29. The upper end of this spring engages the valve head and its lower end engages the shoulder 26a. Extending outwardly from the center of the head 28 is a conical projection 28a removably secured to the stem 27 and which being of lesser diameter than the valve seat opening, performs the dual purpose of securing the pad and also restricting the opening in the valve seat when the head 28 is partially disengaged from said seat. In order that the stem 27 may be retracted on occasion from within the tire to relieve an excessive pressure therein or to actuate the signal in case the pressure becomes subnormal, its lower end which extends into the chamber below the shoulders 26a is provided with a head 30. Guided within the chamber 17b and between the arms 26 is a trip member 31 composed of two similar side pieces integrally connected at their outer ends by a perforated cap 32 through which the valve stem 27 extends. This trip member is normally held in an outward inoperative position by a compression coil spring 33, located beneath it in the chamber of the base 17.

The lower ends of the trip member 31 carry a transverse pin 34, and depending therefrom is a rod 35, the lower end of which extends beyond the flange 18 of the valve stem into the air chamber where it is provided with an enlargement 36 having upper and lower conical surfaces 36a, 36b, the former being located a short distance beneath the flange 18. The extremity of the rod 35 beyond the conical enlargement 36 is guided in a central perforation in a cross bar 37, and fastened to it by the head 35a.

With further reference to the air inlet valve it will be observed that the nipple 25 is threaded exteriorly as indicated at 38 beyond which it is reduced in diameter and again threaded exteriorly to accommodate the connection cap of the usual air pump hose by means of which air is introduced under pressure to inflate the tube 10 in the usual manner. A rubber cap 39 is stretched over the top of the nipple 25 and is enclosed by a retaining closure 40, which engages threads 38. In line with the axis of the valve seat 26b, both the rubber cap and its retaining closure are provided with small, alined perforations as indicated at 45, and in the sides of the closure 40 are round apertures 40a. The perforations 45 are for the purpose of permitting small quantities of air to escape on occasion when the valve head 28 is partially disengaged from its seat 26b and the apertures 40a are for the purpose of allowing larger quantities of air to escape when said head has been retracted sufficiently to disengage the projection 28a from the valve seat aperture. A large quantity of air then escaping will rupture the side walls of the cap with a loud report that will serve as an audible signal.

Associated with the air inlet nipple and in alinement therewith, within the air chamber 10 of the tires is a power member comprising parts which are actuated by changes in the air pressure for retracting rod 35 to open the air inlet valve. The head piece 50 of this element has spaced upwardly extending arms 51, by means of which the power member is fastened to the cross bar 37. The upper ends of these arms are normally held in engagement with the inner or bottom face of the flange 18 by the compression spring 33. In order to counterbalance the effect of centrifugal force acting on these parts during the usual rotation of the associated wheel, which would otherwise tend to overcome the tension of the spring 33, I attach to the head 50 flexible cords 52 which are trained over pulleys 53 carried on bearing members attached to the bottom face of flange 18, and suspended on the free ends of the cords are suitable weights 54.

Projecting downward from the head piece 50 is an annular collar 55, to which is attached a short piece of rubber tubing 56 closed at its other end by a similar head 60. The tube is compressible lengthwise only by air pressure within the tire being held against collapsing under a given air pressure by compression coil springs 63, 64, and by a series of discs 61 formed integrally on a central stem 62, which discs also adapt the tube to fold bellows-like under pressure. This longitudinally compressible member 56 is mounted in a rectangular cage composed of parallel sets of rods 65—65, 66—66 which extend under the head 60 and are attached thereto by a bolt 67. These rods extend past the head 50, which is guided for longitudinal movement thereon, and also extend across the head at a point between the cross bar 37 and the conical enlargement 36, as indicated at 66. The normal distance between the cage members is only slightly greater than the diameter of the rod 35, but their resilient qualities are sufficient to enable them to separate as the cage moves upward so that they will slide over the tapered surface 36b, and thus spring over the enlargement 36, whereby, when there is a loss of air pressure from the tire and the cage is moved in the opposite direction, it will act to retract the valve head 28 from its seat 26b.

The pressure and temperature equilibrator extends from opposite sides of the T-shaped nipple 14 mounted on the inner circumference of the tube 10. The nipple has a flange 70 engaging the inner surface of the tube, to which it is clamped by a collar 71 and a nut 72. The central longitudinal passage of the nipple contains a valve seat 73, against which a valve head 74 is normally held in closed position by a coil spring 75.

Attached to each arm of the nipple 14 is a piece of flexible rubber tubing 76, 77 having secured in their outer ends collars 76a, 77a which are provided with interior conical valve seats 76b, 77b. Guided in these collars are valve heads 78, 79 shaped to close against the valve seats 76b, 77b. The two valve heads are fastened together by the extension spring 80 which normally retracts the valves into open position. The previously mentioned flexible rods 15, 16 are attached respectively to the valve heads 78, 79 at one end, and the other ends are connected to the flange 18 of the base of the air inlet valve stem, whereby upon rotation of the wheel carrying the tire, the weights 15a, 16a will draw the valve heads into closed position against their respective seats. The centrifugal force thus exerted is also ample to extend the rubber tubing pieces 76, 77 together with the coil spring 80 sufficiently to cause air at atmospheric pressure to be drawn through the valve 73—74 into the tubes 76, 77.

The spring 80 is of a diameter sufficient to substantially fill the tubes 76, 77 and prevent their collapse under the operating air pressure contained in the air chamber of tube 10. Since it is important for the successful operation of this element as a pump that it contain as little of the internal air under pressure as possible, I fill the intervening space between the valve heads 78, 79 by inserting in the convolutions of the spring 80 a series of filling pieces or hollow cylindrical spacers 81 which are closed at their ends and are of light weight material.

The size, weight, strength of the several parts of the equilibrator are duly proportioned in accordance with the formula for computing centrifugal force and the theory of expanding gases.

In the construction of the power member 12 it will be understood that the compressional tension of springs 63, 64 must be such as to allow the bottom 60 of the rubber member to be elevated until the top of the cage 65—65, 66—66 engages the bottom 18 of the base of the air inlet nipple with sufficient force to establish an equilibrium with the spring 33 at normal operating air pressure plus a modicum sufficient to overcome the said spring when the pressure is raised above normal and open the inlet valve 26b—28, thus allowing the excess pressure to escape.

With further reference to the power member 12, when the top of the cage 65—65, 66—66 has reached the bottom 18 of the base of the valve nipple, the rubber element will still be susceptible of further compression. And since the bottom end 60 cannot move any further upward, the top end must move downward, overcoming the opposition of the spring 33, and pulling open the inlet valve 26b—28. As long as this valve is held open, it will be impossible to force more air into the tire with a hand or power pump, because the compressed air will follow outwardly the piston of the pump, thereby preventing the inflow of air from the outside at atmospheric pressure.

To elucidate further the operation of the power member 12, normally it is suspended by its upper end from the rod 35, and will continue to be so after the tire has been inflated to or beyond its normal operating pressure. But when the tire begins to lose pressure, thereby allowing the power member to expand, since its top end 50 cannot move upward, its bottom end must move downward. And when by this downward movement, the top of the cage 65—65, 66—66 is brought in engagement with the enlargement 36 on the rod 35, the power member will no longer be suspended by its upper end, but by the top of the cage 65—65, 66—66 instead, and will continue to be so until it draws the head 35a on the rod 35 down far enough to engage the upper face of the head 50 and force the top of the cage 65—65, 66—66 to slip past the enlargement 36, when the power member will again be suspended by its upper end.

Likewise it is thought that the following will aid in understanding certain physical principles involved in the operation of the equilibrator. It will be understood that the air in the tubes 76, 77 expands as the tubes are extended, and at the same ratio. For example, if the area of a cross section of these tubes equals 1 square inch, and the space unoccupied by the fillers 81 equals ½ inch, cubic measure, then an extension of ½ inch in the combined length of the two tubes would decrease the pressure therein to ½ of its original force; and an extension of 1½ inches would reduce the pressure to ¼ of its original force. For example, the atmospheric pressure at sea level is 14 pounds to the square inch, which figure must be added to the gauge reading to determine the total pressure of the air in the tire. Hence, when the gauge reading is 28 pounds the actual pressure is 42 pounds. So if the space occupied by the air is increased 4 times its pressure is reduced to ¼ of its original force or to 10½ pounds, which is 3½ pounds less than the atmospheric pressure. Hence when the tubes have been elongated to their normal operating length, the pressure therein is very much less than the atmospheric pressure.

The operation of my invention is as follows:

Beginning with an empty tire, the retaining closure 40 and the rubber cap 39 are removed and the air pump is connected to the neck of the nipple 25. As air is pumped into the inner tube 10 in the usual way, the increasing pressure will compress the rubber tubing 56 and the springs 63, 64 of the power member 12 forcing the lower end 60 thereof upward until the top members 66—66 of the rectangular cage, in which the power member is mounted engages the inner surface of the flange 18 of the nipple base. Thereafter, any further increase in pressure will cause the top of the power member 12, until now held stationary by the spring 33, to move downward, thereby retracting the rod 35 and disengaging the valve head 28 from its seat to allow air to retrogress from the inner tube 10 and stop the pump from functioning. Or if the tire is filled from a tank, upon removal of the hose nozzle, air will escape from the inner tube 10 until the pressure has been reduced sufficiently to allow the top of the power member to regain its normal position in engagement with the inner face of the flange 18, when the valve head 28 will also engage its seat closing the valve. The same result would follow an increase of pressure in a normally inflated tire, whether caused by the equilibrator, atmospheric changes or friction against the roadbed.

After the tire has been duly inflated to its normal operating capacity, predetermined by the power member in the manner above described, and the rubber cap 39 and retaining closure 40 restored to their usual position, any loss of pressure by leakage or otherwise, will cause the lower end of the power member 12 to recede from its normal operating position until the tops 66—66 of the rectangular cage engage the enlargement 36 on the rod 35 which will be retracted, thereby disengaging the valve head 28 from its seat, and finally opening the valve completely whereupon air will escape from the inner tube through the canal 17c in the base of the inlet valve nipple in sufficient quantity to rupture the rubber cap 39, thereby producing an audible warning signal. Air will continue to escape through the nipple, and the bottom of the power member will continue to move downward until the end of the rod 35 engages the top of the head 50, whereby the cage 66—66 will be forced to release its hold on the enlargement 36, when the spring 33 as well as the valve head 28 will regain their normal positions, thereby closing the valve to prevent the needless loss of air through the nipple after the warning signal has been sounded. Any increases of pressure above the normal operating figure generally will but partially open the valve 26b—28, while a loss of pressure because of a leak or puncture will invariably open the valve completely.

When the wheel carrying the tire equipped with my invention begins to rotate, the pull of centrifugal force generated thereby on the power member 12 which might otherwise tend to interfere with its proper functioning is counterbalanced by an equal pull by the same force on the weights 54.

And when the vehicle with which the wheel may be associated attains its normal operating speed, that same centrifugal force will throw the weights 15a, 16a away from their inactive position at the inner circumference of the chamber of the inner tube 10 towards the outer circumference of the same, whereby the valves 76b—78, 77b—79 normally held open when inactive by the extension coil spring 80, will be closed and the body of the equilibrator extended, thereby creating a partial vacuum therein, which will be filled by the inflow of air at atmospheric pressure through the valve 73—74. And when the vehicle is subsequently stopped or its speed substantially decreased, the centrifugal force will cease or be correspondingly decreased until it is overcome, partly by the spring 80, and partly by the air pressure in the inner tube 10: Whereupon the valves 76b—78, 77b—79 will return to their normal, inactive, open position, thus permitting the surrounding air in the tube 10 to rush in to mix with the air in the body of the equilibrator, whereby the temperature of the mixture will be reduced, and any loss of air which might have been caused by leakage restored, at least to the extent of the air sucked in by the equilibrator. Or if there has been no leakage, an equivalent amount of air will be discharged by the power member through the valve 26b—28. In either event, the temperature of the air remaining in the inner tube 10 will be reduced, correspondingly by the quantities of fresh air drawn in periodically by the equilibrator.

Because of the great disparity between the density of the air surrounding the equilibrator and that within it, when the centrifugal force first begins to decline and the equilibrator to contract, the rubber tubes 76, 77 will retract the valve seats 76b, 77b as fast as the spring 80 retracts the valve heads 78, 79, consequently, the valves will remain closed; but as the density of the two bodies of air approaches parity as they will do because of the compression of the air within the equilibrator, the valve seats will begin to lag momentarily, thus allowing the valves to be pulled open by the spring 80.

The relief valve mechanism described in the foregoing specification has been made the subject of a separate co-pending application Serial Number 34,438, filed March 30, 1949. In this application, I claim:

1. The combination with a pneumatic tire of an automatic pump disposed therein comprising two flexible tubes joined at one end by a union provided with a tubular stem connecting the interior of the the tubes with the exterior of the tire, an inlet valve in the said stem, valve seats in the free ends of the tubes, valve heads cooperating with the valve seats, and means operated centrifugally by rotation of the tire to close said valve heads against their seats and elongate the tubes.

2. The combination with a pneumatic tire of an equilibrator disposed therein comprising two flexible tubes joined at one end by a union provided with a tubular stem connecting the interior of the tubes with the exterior of the tire, an inlet valve in said stem, valve seats in the free ends of the tubes, valve heads cooperating with the valve seats, and means operated centrifugally by rotation of the tire for closing the valve heads against the valve seats and elongating the tubes to reduce the pressure of air therein, and a contractile spring disposed within the tubes serving to counteract the centrifugal force to restore the tubes and open the valves therein upon the cessation of the rotation of the tire.

3. The combination with a pneumatic tire of an equilibrator pump disposed therein comprising two flexible tubes joined at one end by a union provided with a tubular stem connecting the interior of the tubes with the exterior of the tire, an inlet valve in said stem, valve seats in the free ends of the tubes, valve heads cooperating with the valve seats, a contractile spring connected to the valve heads and serving to space them with the tubes at their normal length, and means operated centrifugally by rotation of the tire for engaging the valve heads with their seats and elongating the tubes to reduce the density of the air therein.

4. The combination with a pneumatic tire and a tubular valve stem opening exteriorly thereof having an inlet valve therein, of an equilibrator pump comprising two flexible tubes joined at one end by a union supported on the stem and interiorly in connection with the inner end of the stem, a contractile spring within the tubes, valve seats in the free ends of the tubes, valve heads connected to the ends of the spring and cooperating with the valve seats, means operated by the centrifugal force created upon rotation of the tire for moving the valve heads in opposite direction to close off the interior of the tubes and elongate them against the tension of the spring.

5. The combination with a pneumatic tire and a tubular valve stem opening exteriorly thereof having an inlet valve therein, of an equilibrator pump comprising two flexible tubes joined by a union supported on the stem, and interiorly in communication with the inner end of the stem, a contractile spring within the tube, valve seats in the free ends of the tubes, valve heads connected to the ends of said spring and cooperating with the said valve seats, filler pieces in the coils of the spring between the valve heads for reducing the interior capacity of the tubes, and means operated by the centrifugal force created upon rotation of the tire for moving said valve heads in opposite direction to close off the interior of the tubes and elongate them against the tension of the spring.

6. The combination with a pneumatic tire, of an equilibrator pump disposed therein comprising two flexible tubes with one end joined together by a union having valve seats in their other end, valve heads cooperating with said valve seats, a contractile spring connected to said heads and serving to space them with the tubes at their normal length, a tubular valve stem connecting the interior of the tubes with the exterior of the tire having an air inlet valve, a curved rod extending around the inner circumference of the tire with its ends connected to said valve heads, and weights carried by the rod which serve under the action of the centrifugal force created upon rotation of the tire to move said valve heads in opposite direction and elongate the said tubes.

7. The combination with a pneumatic tire having an air inlet valve stem and valve at one point on its inner periphery, a second inlet valve stem and valve at a diametrically located point on said periphery, of an air intake pump comprising an elongated tubular body carried on the second valve stem and connected interiorly therewith, valve seats in the ends of the tubular body, valve heads cooperating with the valve seats and normally disengaged therefrom, a contractile spring connecting the valve heads, two curved rods connected at one end to each of the valve heads and anchored at their other end to the bottom or base of the valve stem first mentioned, and weights fastened to said rods intermediate their extremities.

WILLIAM ADDISON CALDWELL.

REFERENCES CITED

The following references are of record in the file of this patent:

UNITED STATES PATENTS

| Number | Name | Date |
|---|---|---|
| 1,303,893 | Haskins et al. | May 20, 1919 |
| 1,930,041 | Crowley et al. | Oct. 10, 1933 |
| 2,030,592 | Hosking | Feb. 11, 1936 |

FOREIGN PATENTS

| Number | Country | Date |
|---|---|---|
| 758,169 | France | 1933 |